US012482977B2

(12) United States Patent
Tsutsui et al.

(10) Patent No.: US 12,482,977 B2
(45) Date of Patent: Nov. 25, 2025

(54) CONTACT ASSEMBLY

(71) Applicant: Tyco Electronics Japan G.K., Kawasaki (JP)

(72) Inventors: Yuki Tsutsui, Kawasaki (JP); Junto Hoshiba, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 400 days.

(21) Appl. No.: 18/162,041

(22) Filed: Jan. 31, 2023

(65) Prior Publication Data

US 2023/0178919 A1 Jun. 8, 2023

Related U.S. Application Data

(63) Continuation of application No. PCT/JP2021/008962, filed on Mar. 8, 2021.

(30) Foreign Application Priority Data

Jul. 31, 2020 (JP) ................................ 2020-130027

(51) Int. Cl.
*H01R 13/11* (2006.01)
*H01R 13/187* (2006.01)
*H01R 13/40* (2006.01)
*H01R 25/16* (2006.01)

(52) U.S. Cl.
CPC ........... *H01R 13/11* (2013.01); *H01R 13/187* (2013.01); *H01R 13/40* (2013.01); *H01R 25/16* (2013.01)

(58) Field of Classification Search
None
See application file for complete search history.

(56) References Cited

U.S. PATENT DOCUMENTS 3,427,419 A * 2/1969 Findley, Jr. .............. H01H 1/42 200/255
4,423,917 A * 1/1984 Scheingold ........ H01R 13/6315 439/249
4,894,029 A 1/1990 Pope
(Continued)

FOREIGN PATENT DOCUMENTS

DE 10117061 A1 10/2002
JP 322362 U1 1/1990
(Continued)

OTHER PUBLICATIONS

Japanese Office Action dated Feb. 13, 2024 with English translation, corresponding to Application No. 2020-130027, 10 pages.
(Continued)

*Primary Examiner* — Ross N Gushi

(57) ABSTRACT

A contact assembly includes a plurality of contacts serving as a socket in a laminated state and a spring. The contacts each have a mating portion forming the socket and a caught portion caught on a caught portion of another one of the contacts in a lamination direction of the contacts. At least two of the contacts adjacent to each other in the lamination direction have electrical continuity with each other via the spring that is compressible in the lamination direction between the caught portion of each of the contacts.

18 Claims, 8 Drawing Sheets

(56) References Cited

U.S. PATENT DOCUMENTS

| | | | | |
|---|---|---|---|---|
| 5,052,953 | A * | 10/1991 | Weber | H01R 12/718 439/857 |
| 6,325,640 | B1 | 12/2001 | Kasai | |
| 6,921,301 | B2 * | 7/2005 | Conrad | H01R 12/7088 439/867 |
| 6,974,329 | B2 * | 12/2005 | Henneberg | H01R 12/585 439/59 |
| 7,097,491 | B2 * | 8/2006 | Neumann-Henneberg | H01R 13/055 439/948 |
| 7,168,990 | B2 * | 1/2007 | Suzuki | H01R 13/112 439/267 |
| 7,419,407 | B1 * | 9/2008 | Jolly | H01R 13/2435 439/714 |
| 7,909,663 | B1 * | 3/2011 | Bouffet | H01R 13/18 439/787 |
| 8,123,553 | B2 * | 2/2012 | Lyu | H02B 11/04 200/254 |
| 8,197,289 | B1 * | 6/2012 | Faber | H02B 11/04 439/819 |
| 8,366,451 | B2 * | 2/2013 | Littek | H01R 13/113 439/12 |
| 9,431,721 | B2 * | 8/2016 | Wimmer | H01R 13/113 |
| 10,128,624 | B2 | 11/2018 | Tyler et al. | |
| 10,522,945 | B2 * | 12/2019 | Schneider | H01R 13/10 |
| 10,763,607 | B2 * | 9/2020 | Schneider | H05K 1/144 |
| 10,784,623 | B2 * | 9/2020 | Schneider | H01R 12/585 |
| 10,998,675 | B2 * | 5/2021 | Lynch | H01R 13/112 |
| 11,189,947 | B2 * | 11/2021 | Schrader | H01R 12/7088 |
| 11,355,902 | B2 * | 6/2022 | Corban | H01R 13/187 |
| 11,362,444 | B2 * | 6/2022 | Schneider | H01R 4/2425 |
| 11,469,056 | B2 * | 10/2022 | Bossoni | H01H 1/14 |
| 11,699,887 | B2 * | 7/2023 | Jin | H01R 25/162 439/214 |
| 11,721,918 | B2 * | 8/2023 | Li | H01R 4/48 439/709 |
| 11,855,398 | B2 * | 12/2023 | Qian | H01R 13/035 |
| 12,191,614 | B2 * | 1/2025 | Cavallieri | H01R 9/26 |
| 2012/0003843 | A1 | 1/2012 | Hashiguchi | |
| 2012/0052752 | A1 | 3/2012 | Littek et al. | |
| 2016/0020052 | A1 * | 1/2016 | Kaufman | H01R 25/162 439/121 |
| 2023/0208078 | A1 * | 6/2023 | Behling | H01R 25/14 439/248 |
| 2024/0332862 | A1 * | 10/2024 | Liu | H01R 13/6315 |
| 2024/0364061 | A1 * | 10/2024 | Wang | H01R 13/112 |
| 2025/0046532 | A1 * | 2/2025 | Rota Martir | H01R 13/193 |
| 2025/0070497 | A1 * | 2/2025 | Wang | H01R 13/20 |

FOREIGN PATENT DOCUMENTS

| | | | |
|---|---|---|---|
| JP | H07111888 | B2 | 11/1995 |
| JP | 2000201419 | A | 7/2000 |
| JP | 201215022 | A | 1/2012 |
| JP | 201254234 | A | 3/2012 |
| JP | 2019523537 | A | 8/2019 |
| WO | 2022024437 | A1 | 2/2022 |

OTHER PUBLICATIONS

Extended European Search Report dated Jul. 3, 2024, corresponding to Application No. 21849061.3-1201 / 4191807 PCT/JP2021008962, 11 pages.

Japanese International Search Report and Written Opinion with English translation dated May 18, 2021 corresponding to Application No. PCT/JP2021/008962, 11 pages.

Japanese Office Action dated Jun. 21, 2024 with English translation, corresponding to Application No. 2020-130027, 10 pages.

* cited by examiner

CONTACT ASSEMBLY

CROSS-REFERENCE TO RELATED APPLICATIONS

This application is a continuation of PCT International Application No. PCT/JP2021/008962, filed on Mar. 8, 2021, which claims priority under 35 U.S.C. § 119 to Japanese Patent Application No. 2020-130027, filed on Jul. 31, 2020.

FIELD OF THE INVENTION

The present invention relates to a contact assembly including a plurality of electrical contacts.

BACKGROUND

Japanese Patent Application No. JP2019-523537A discloses a header connector including a plurality of contact elements laminated and identical in shape, and a housing accommodating the contact element laminate. Each contact element is formed with a pair of spring beams at each of both ends. Once the contact elements are laminated, the pairs of spring beams of the laminate as a whole serve as a socket for receiving a mating counterpart. For example, the socket at one of the ends mates with a tab terminal, and the socket at the other end mates with a power busbar.

The spring beams constituting the socket described in JP2019-523537A deflects in conformity to the mating counterpart. In addition, since the mating counterpart comes into contact with each of the contact elements laminated, a large number of contact points are provided. Therefore, once installed in a power circuit, the contact element laminate described in JP2019-523537A can contribute to an increase in current carrying capacity based on the large number of contact points. There is a need, however, to improve a structure including a contact laminate serving as a socket.

SUMMARY

A contact assembly includes a plurality of contacts serving as a socket in a laminated state and a spring. The contacts each have a mating portion forming the socket and a caught portion caught on a caught portion of another one of the contacts in a lamination direction of the contacts. At least two of the contacts adjacent to each other in the lamination direction have electrical continuity with each other via the spring that is compressible in the lamination direction between the caught portion of each of the contacts.

BRIEF DESCRIPTION OF THE DRAWINGS

The invention will now be described by way of example with reference to the accompanying Figures, of which.

DETAILED DESCRIPTION OF THE EMBODIMENTS

Each embodiment of the present invention will be described below with reference to the drawings.

Figure 1:
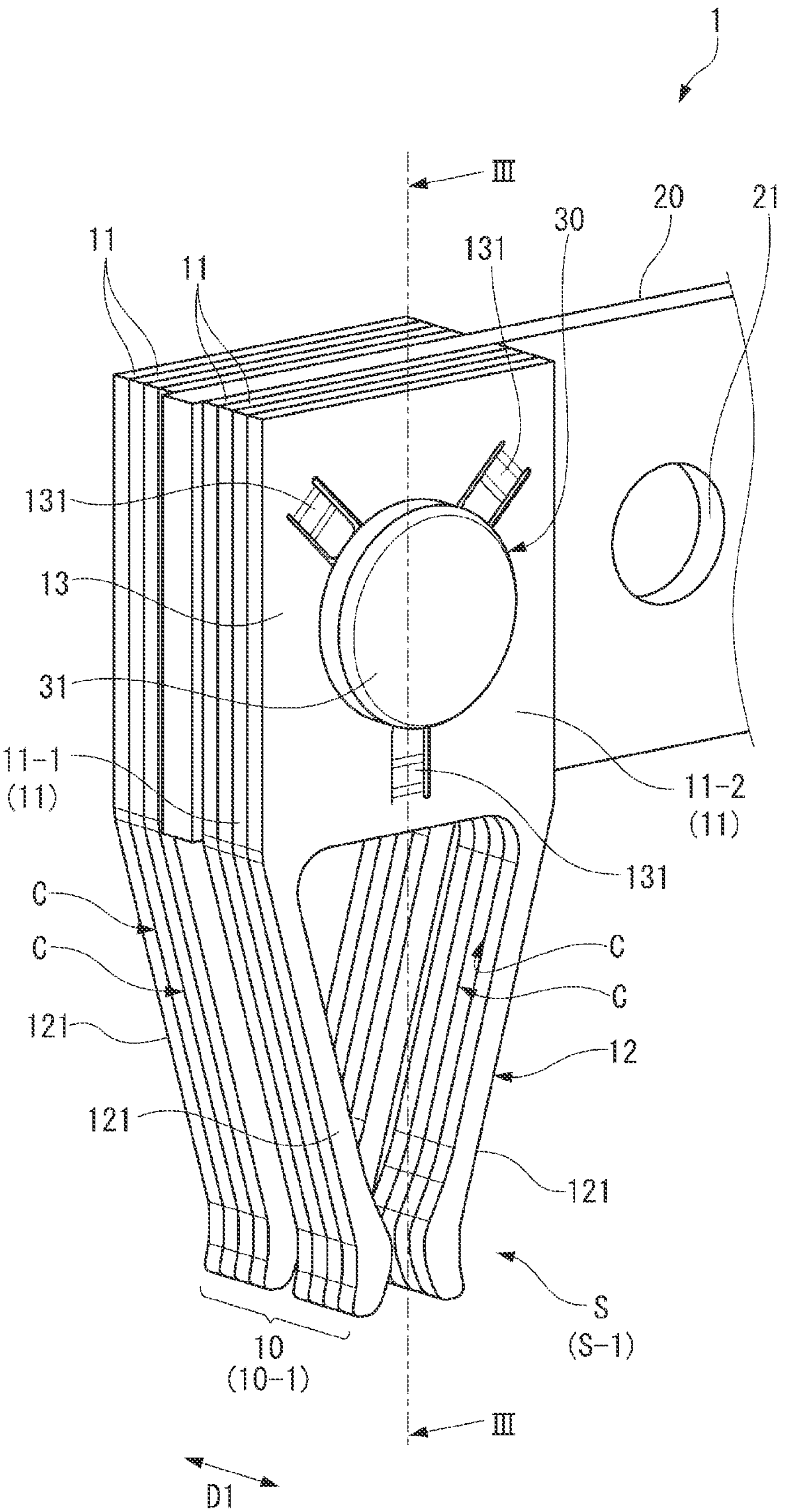
FIG. 1 is an isometric view of a contact assembly according to a first embodiment of the present invention.

A contact assembly 1 shown in FIG. 1, according to a first embodiment, includes a contact group 10 serving as a socket S, a busbar 20 (conductor) laminated with the contact group 10, and a fastening element 30 integrating the contact group 10 and the busbar 20 together. The contact assembly 1 can be used, for example, for a power carrying circuit mounted on a vehicle or the like.

The contact group 10, as shown in FIG. 1, is composed of a plurality of contacts 11 laminated.

Figure 2A:
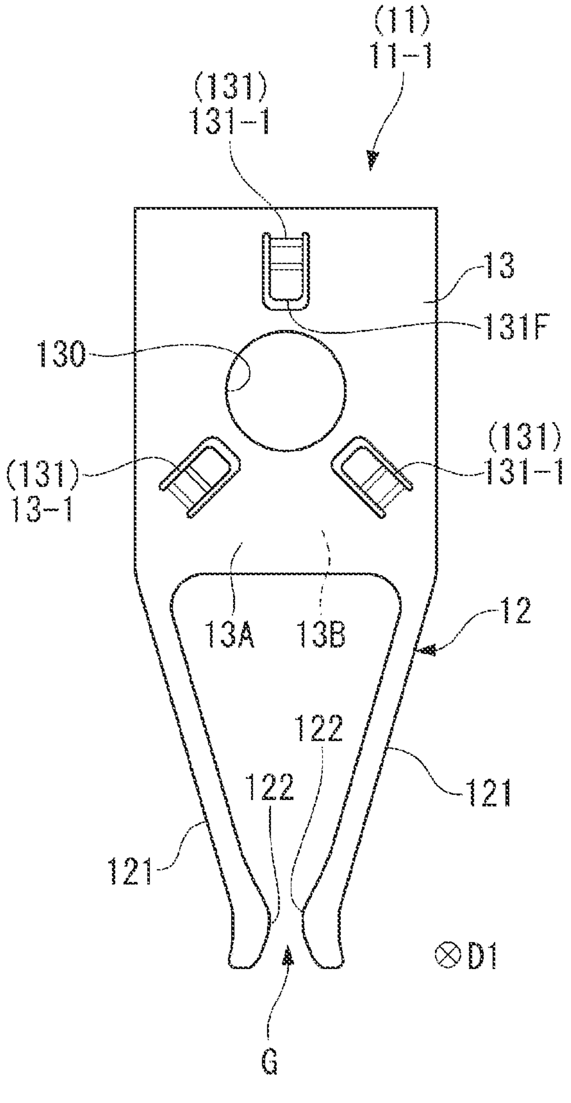
FIG. 2A is a top view of a first contact of a contact group shown in FIG. 1.
Figure 2B:
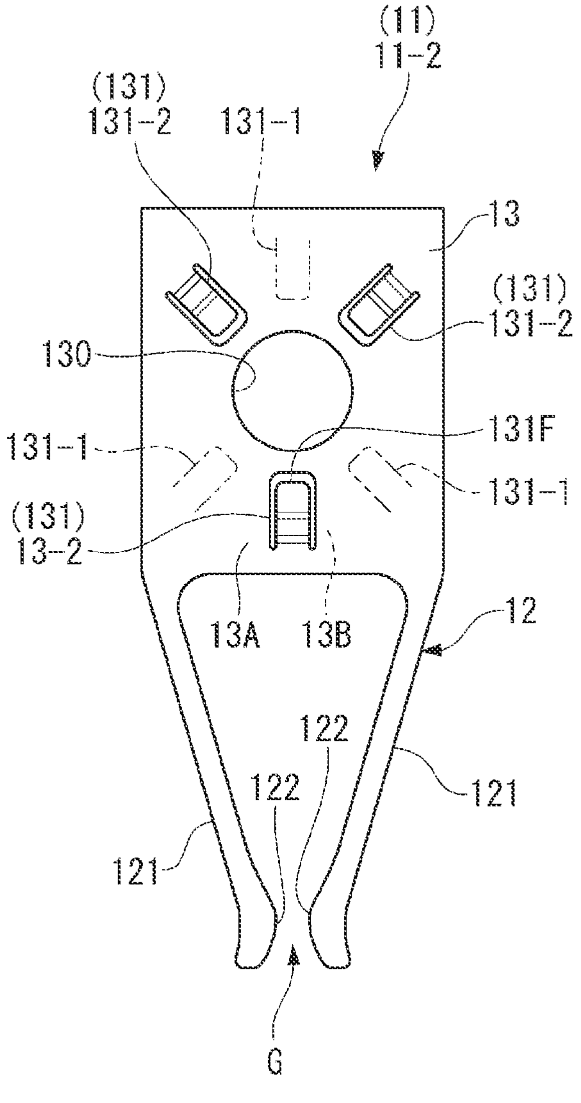
FIG. 2B is a top view of a second contact of the contact group shown in FIG. 1.

As shown in FIGS. 2A and 2B, each contact 11 includes a mating portion 12 forming the socket S and a caught portion 13 caught on a caught portion 13 of another contact 11 in a lamination direction D1 of the contacts 11. The contacts 11 can be formed, for example, by stamping and forming a sheet made of a metal material such as an aluminum alloy.

The adjacent contacts 11 are partially or entirely separated and stacked together. That is, the adjacent contacts 11 may also be separated while their outlines almost overlap each other in the lamination direction D1.

A clearance C (FIG. 3) is given between the mating portions 12 laminated. Though not shown in FIG. 1, a space as the clearance C is actually present between the mating portions 12. The positions of the clearances C are indicated by "C" in FIG. 1. The same applies to FIG. 8.

Figure 3:
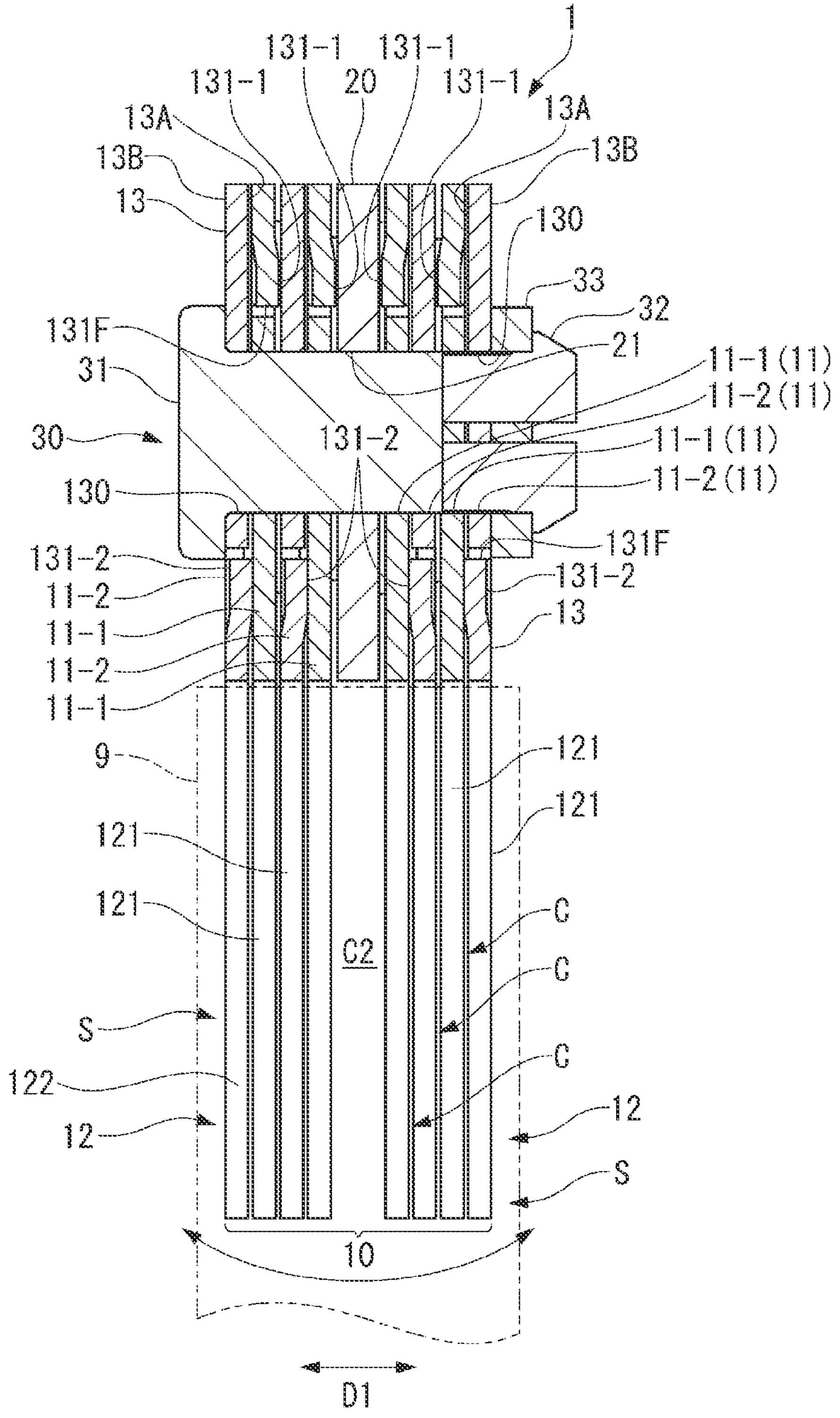
FIG. 3 is a sectional side view of the contact assembly, taken along line of FIG. 1.

The mating portion 12 is composed of a pair of arms 121 extending from the rectangular caught portion 13. Once the contacts 11 are laminated with their arms 121 oriented unidirectionally, the pairs of arms 121 of the laminate as a whole serve as the socket S (FIG. 1) for receiving a mating counterpart 9 (FIG. 3). The orientation of the socket S can be adjusted by rotating the contacts 11 on the fastening element 30 and changing the orientation of the arms 121. The socket S can be oriented in any direction.

The mating counterpart 9, shown schematically in FIG. 3, is, for example, a busbar other than the busbar 20, a tab terminal, or the like. Once the sheet-like mating counterpart 9 is mated into the socket S through a gap G at distal ends of the pairs of arms 121, the mating counterpart 9 comes into contact with respective contact point portions 122 of the mating portions 12 of the contact group 10.

The caught portion 13, as shown in FIGS. 2A, 2B, and 3, includes a through-hole 130 passing therethrough in a sheet thickness direction (the lamination direction D1), and a spring 131 compressible in the lamination direction D1 and positioned in the vicinity of and/or around the through-hole 130. The spring 131 is composed of a lanced tab formed by cutting and bending like a cantilever on a first face 13A of the caught portion 13. In an embodiment a plurality of (three in the present embodiment) springs 131 may be positioned around the through-hole 130.

The plurality of contacts 11 laminated are caught on each other, with the spring 131 compressed, by the fastening element 30 (FIGS. 1 and 3) passing through the through-holes 130 of the caught portions 13.

The contact group 10, as shown in FIGS. 2A and 2B, includes a first contact 11-1 and a second contact 11-2 having different arrangements of the springs 131 in the caught portion 13. The springs 131 (131-1) of the first contact 11-1 are positioned at equal intervals around the through-hole 130. The springs 131 (131-2) of the second contact 11-2 are positioned at equal intervals around the through-hole 130 but in different phases from the springs 131-1 of the first contact 11-1.

In order to facilitate positioning the springs 131-1 and the springs 131-2 in different phases, the springs 131-1, 131-2 are all formed radially around the through-hole 130.

In order to facilitate transmission of an axial force applied by the fastening element 30 to the springs 131, each spring 131 may be formed in the caught portion 13 such that a free end 131F lies in the vicinity of the through-hole 130.

The shape, arrangement, and/or lancing direction of the spring 131 is not limited to those in the present embodiment but may be determined appropriately. Not only the spring 131 formed by cutting and bending on the first face 13A but also the spring 131 formed by cutting and bending on a second face 13B may be provided to the caught portion 13.

The first contacts 11-1 and the second contacts 11-2 are positioned alternately in the lamination direction D1 (see FIG. 3). This causes each spring 131-1 of the first contact 11-1 to be positioned between the springs 131-2 of the second contact in a circumferential direction of the through-hole 130, as shown by a long-dashed double-short dashed line in FIG. 2B.

In the present embodiment, the busbar 20 is interposed between a subgroup of two or more contacts 11 and another subgroup of two or more contacts 11, and caught by the fastening element 30 along with the contact group 10. The fastening element 30 is passed through a connection hole 21 passing through the busbar 20 in the sheet thickness direction. The mating portions 12 of the contacts 11 project from the busbar 20.

On both sides of the busbar 20 in the lamination direction D1, the first contacts 11-1 and the second contacts 11-2 are laminated alternately and oriented such that the free ends 131F of the springs 131 lie on a side toward the busbar 20 relative to the surface of the caught portion 13.

The fastening element 30 includes, for example, a first pin 31, a second pin 32, and a washer 33, as shown in FIG. 3.

Once a shaft portion of the first pin 31 inserted into the laminate of the contacts 11 and the busbar 20 through one side of the lamination direction D1 and a shaft portion of the second pin 32 inserted thereinto through the other side of the lamination direction D1 are screwed or otherwise coupled, such as by swaging, an axial force is applied to the laminate. The axial force causes the springs 131 to be compressed between the respective caught portions 13 of the adjacent contacts 11 and between the busbar 20 and the caught portion 13 of the contact 11 adjacent to the busbar 20, and elastically deform in the lamination direction D1.

Regarding the first contact 11-1 and the second contact 11-2, the spring 131-1 of the first contact 11-1 is pressed against a flat portion not formed with the spring 131-2 in the caught portion 13 of the second contact 11-2. In addition, the spring 131-2 of the second contact 11-2 is pressed against a flat portion not formed with the spring 131-1 in the caught portion 13 of the first contact 11-1.

Since the first contact 11-1 is adjacent to the busbar 20 in an example shown in FIG. 3, the spring 131-1 of the first contact 11-1 is pressed against the surface of the busbar 20. In this manner, electrical continuity is established using the elastic force of the spring 131 between the adjacent contacts 11 and between the contact 11 and the busbar 20 adjacent to each other.

As shown in FIG. 3, the mating portions 12 extending in the same direction from the respective caught portions 13 of the contact group 10 caught by the fastening element 30 serve as the socket S. Each caught portion 13 is located in the lamination direction D1 by the fastening element 30 and the spring 131. On the other hand, the mating portions 12 not including the springs 131 are located so as to be laminated via the clearances C.

Figure 4:
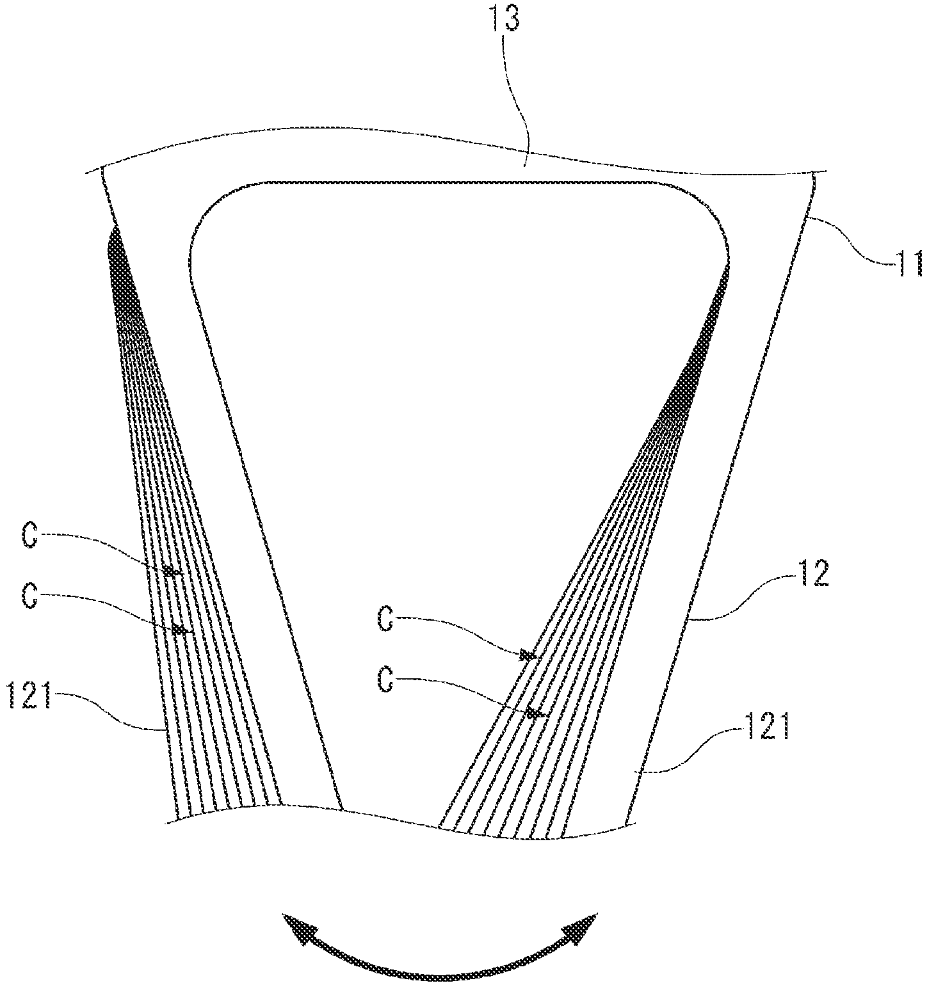
FIG. 4 is a top view of an example of a displaced and deformed state of mating portions of contacts laminated when a mating counterpart is inserted.

Each of the mating portions 12 laminated deflects to be displaced and deformed in appropriate directions including a direction along the sheet thickness direction (see an arrowed line in FIG. 3) and a rotation direction of the shaft of the fastening element 30 (see an arrowed line in FIG. 4), and thereby the socket S as a whole can conform to the mating counterpart 9. The presence of the clearance C between the mating portions 12 facilitates deflection of each mating portion 12, thus enabling the mating portions 12 to conform to the mating counterpart 9 sufficiently. Each mating portion 12 is displaced/deformed, by way of example, so as to expand at its distal end in a direction indicated by the arrowed line in FIG. 3. Alternatively, as shown in FIG. 4, each mating portion 12 is displaced/deformed so as to expand on a pivot like a folding fan. Alternatively, each mating portion 12 may be displaced/deformed three-dimensionally both in the arrow direction in FIG. 3 and in the arrow direction in FIG. 4.

Therefore, even if the mating counterpart 9 is, for example, angled relative to the lamination direction D1 and inserted into the socket S, the displacement and deformation of each mating portion 12 cause the attitude of the socket S to follow the mating counterpart 9. Furthermore, with each mating portion 12 in contact with the mating counterpart 9, the socket S elastically supports the mating counterpart 9. At this time, since the mating portions 12 of a large number of contacts 11 located in the lamination direction D1 by the springs 131 are arranged with a narrow pitch with the clearances C therebetween, contact points corresponding in number to the contacts are provided between the socket S which the mating portions 12 serves as and the mating counterpart 9.

In the present embodiment, a space C2 shown in FIG. 3 is formed between the mating portion 12 of the contact 11 laminated on one face of the busbar 20 and the mating portion 12 of the contact 1 laminated on the other face of the busbar 20. The presence of this clearance C2 further facilitates displacement/deformation of the mating portions 12, thus enabling more satisfactory conformity to the mating counterpart 9.

According to the contact assembly 1, because the contacts 11 conform to the mating counterpart 9 based on the laminate structure, respective position errors and/or dimension and shape errors of the mating counterpart 9 and the socket S are absorbed, so that the mating counterpart 9 and the contact assembly 1 can be stably connected, and their connection can also be retained even if an external force such as vibration is applied. Therefore, the reliability of connection can be ensured.

According to the contact assembly 1, since each contact 11 can be located by the spring 131 with the fine clearance C set between the mating portions 12, it can be ensured that the mating portions 12 are distributed in the lamination direction D1 while a sufficiently large number of contacts 11 laminated per unit thickness are secured. This can further ensure that a large number of contact points are provided to the socket S, as compared to a case where the contact assembly 1 does not include the spring 131, and also enables suppression of an increase in temperature by promotion of heat dissipation due to an increase in the surface area of the contact 11. The suppression of an increase in temperature enables avoidance of an increase in electrical resistance, which can contribute to an increase in power carrying capacity.

Furthermore, according to the contact assembly 1, since the contact assembly 1 includes the busbar 20 laminated on the contacts 11, the freedom of wiring can be improved by increasing contact points in an extension direction of the busbar 20.

Figure 5:
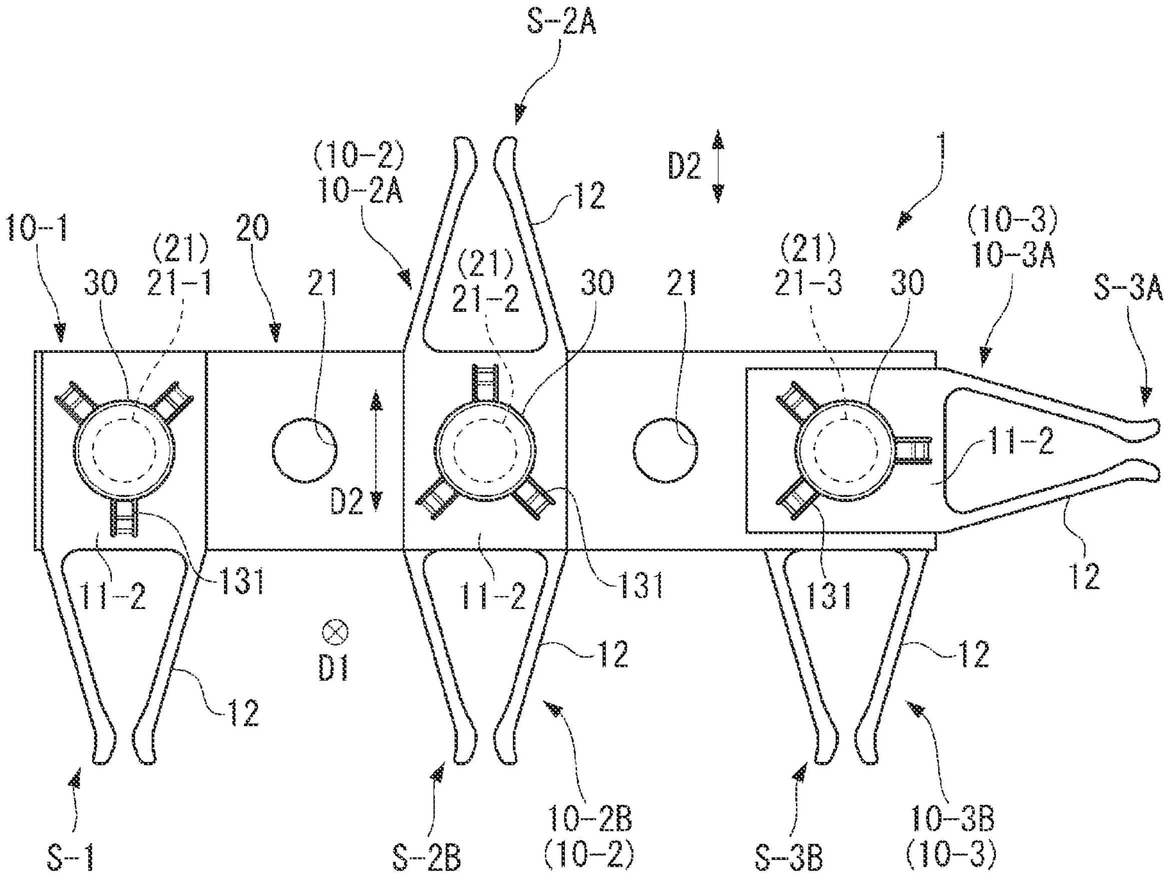
FIG. 5 is a top view showing an example of assembly of contacts and a conductor.

The rectangular busbar 20 shown in FIG. 5 extends in a direction crossing the lamination direction D1 (a direction perpendicular to the plane of paper of FIG. 5). The busbar 20 is formed with a plurality of connection holes 21 at predetermined intervals in the extension direction. The contact group 10 composed of two or more contacts 11 can be provided in the respective positions of two or more connection holes 21 freely selected from these connection holes 21.

In an example shown in FIG. 5, a first contact group 10-1 (FIG. 1) is provided in the position of a first connection hole 21-1 of the busbar 20, a second contact group 10-2 is provided in the position of a second connection hole 21-2, and a third contact group 10-3 is provided in the position of a third connection hole 21-3. The first to third contact groups 10-1, 10-2, 10-3 are each fastened to the busbar 20 with fastening elements 30 given individually. The first contact group 10-1 serves as a socket S-1. The second contact group 10-2 serves as sockets S-2A, S-2B. The third contact group 10-3 serves as sockets S-3A, S-3B.

The second contact group 10-2 are divided into a contact subgroup 10-2A fastened to the busbar 20 and oriented so as to have the mating portions 12 projecting in one of width directions D2 of the busbar 20, and a contact subgroup 10-2B fastened to the busbar 20 and oriented so as to have the mating portions 12 projecting in the other width direction D2 of the busbar 20. It should be noted that the contact subgroup 10-2A and the contact subgroup 10-2B may not necessarily be divided using the busbar as a boundary, and can be divided in any position in the lamination direction D1.

In the plane of paper of FIG. 5, the contact subgroup 10-2A positioned on the front face of the busbar 20 serves as the socket S-2A. In addition, the contact subgroup 10-2B positioned on the back face of the busbar 20 serves as another socket S-2B having a different orientation from the socket S-2A.

In addition, the third contact group 10-3 are likewise divided into a contact subgroup 10-3A and a contact subgroup 10-3B. The contact subgroup 10-3A serves as the socket S-3A, and the contact subgroup 10-3B serves as the socket S-3B.

Figure 6:
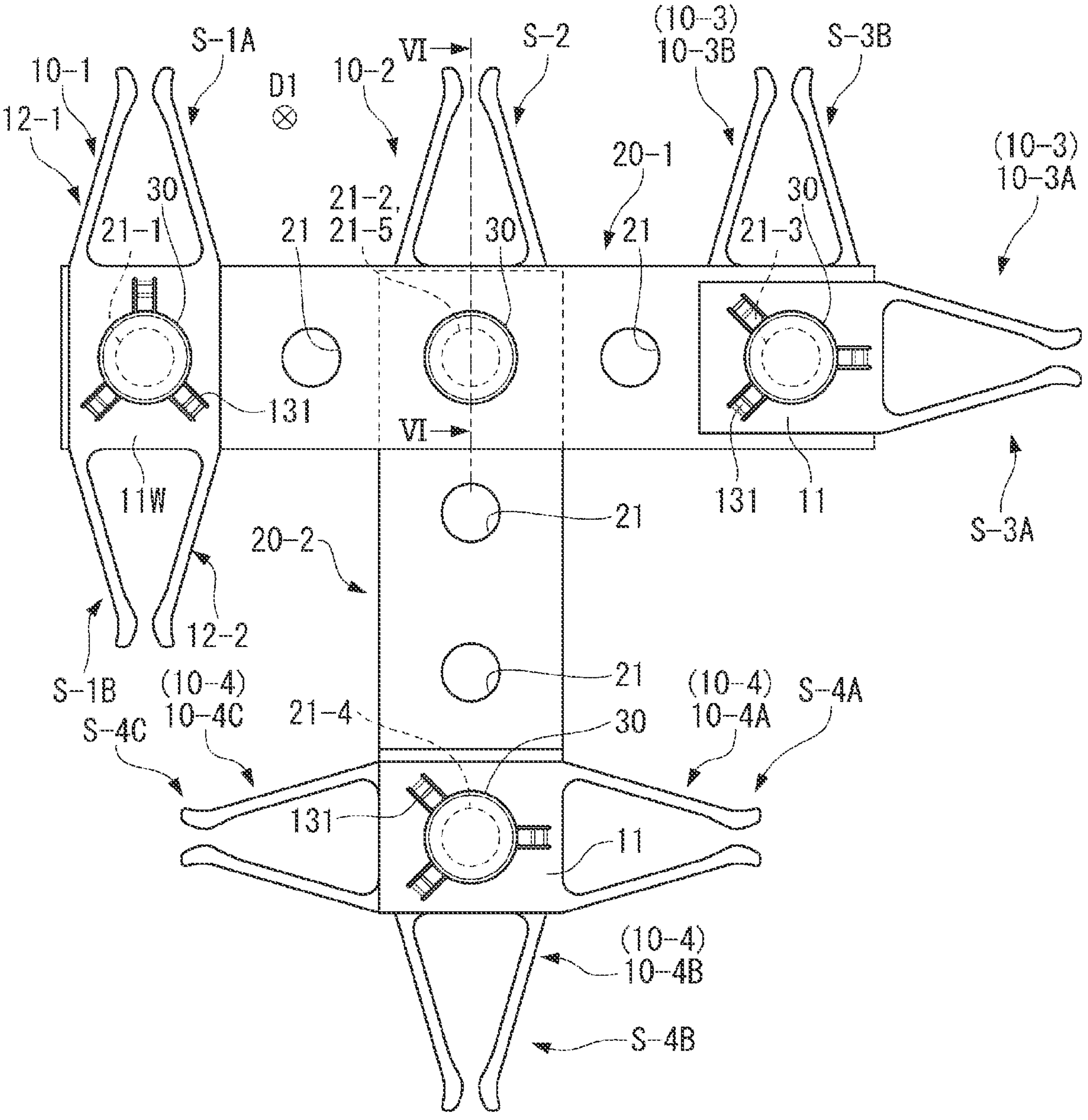
FIG. 6 is a top view showing another example of assembly of contacts and conductors.

FIG. 6 shows an example of using a plurality of busbars 20-1, 20-2 to achieve a further increase in the number of contact points. In the example shown in FIG. 6, a first contact group 10-1 serving as sockets S-1A, S-1B is provided in the position of a first connection hole 21-1 of the first busbar 20-1. The first contact group 10-1 in FIG. 6 is composed of contacts 11W including a pair of mating portions 12-1, 12-2.

A second contact group 10-2 serving as a socket S-2 is provided in the position of a second connection hole 21-2. A third contact group 10-3 serving as sockets S-3A, S-3B is provided in the position of a third connection hole 21-3.

In addition, a fourth contact group 10-4 is provided in the position of a connection hole 21-4 of the second busbar 20-2. The fourth contact group 10-4 is divided in the lamination direction D1 into a contact subgroup 10-4A serving as a socket S-4A, a contact subgroup 10-4B serving as a socket S-4B, and a contact subgroup 10-4C serving as a socket S-4C.

Like the contact group 10-3 or the contact group 10-4 described above, the contact group 10 caught by the same fastening element 30 can be divided for use into an appropriate number corresponding to the number of sockets S. The orientation of the socket S may be angled relative to the extension direction of the first busbar 20-1 and/or the second busbar 20-2.

Figure 7:
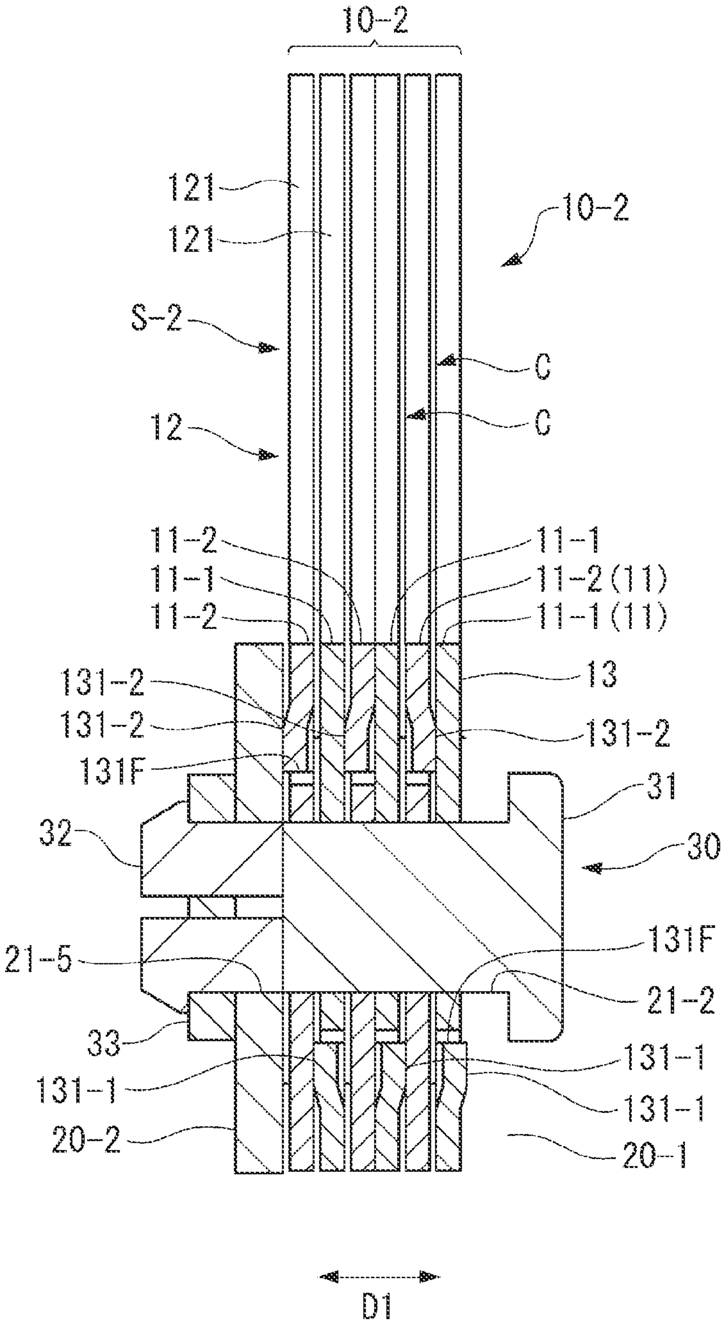
FIG. 7 is a sectional side view taken along line VI-VI of FIG. 6.

The shaft portion of the fastening element 30 passed through the second connection hole 21-2 is also passed through the connection hole 21-5 (FIG. 7) of the second busbar 20-2. This fastening element 30 connects the first busbar 20-1 and the second busbar 20-2 together. At a location where the first busbar 20-1 and the second busbar 20-2 are connected together, for example, as shown in FIG. 7, all the contacts 11 of the second contact group 10-2 are positioned between the first busbar 20-1 and the second busbar 20-2. The contacts 11 of the second contact group 10-2 shown in FIG. 7, like the contacts 11 of the contact group 10 shown in FIG. 3, also deflect in conformity to a mating counterpart received in the socket S-2, and elastically supports the mating counterpart.

In the example shown in FIG. 7, on a side toward the first busbar 20-1 from the center in the lamination direction D1, the first contacts 11-1 and the second contacts 11-2 are alternately positioned such that the springs 131 project toward the first busbar 20-1. On a side toward the second busbar 20-2, the first contacts 11-1 and the second contacts 11-2 are alternately positioned such that the springs 131 project toward the second busbar 20-2.

This causes the first contact 11-1 and the second contact 11-2 lying centrally in the lamination direction D1 to have their flat faces in contact with each other, and have no electrical continuity with each other via the spring 131. In this manner, even if some adjacent contacts 11 of the laminate have no electrical continuity with each other, the laminate of the contacts 11 as a whole can achieve an increase in the number of contact points due to distribution of the mating portions 12 with a narrow pitch, and can also contribute to suppression of an increase in temperature due to promotion of heat dissipation due to an increase in the surface area of the contact 11. Furthermore, the conformability to the mating counterpart 9 is also improved. Therefore, not all the contacts 11 included in the laminated contact group are required to include the spring 131. The laminated contact group may include a contact which is flat on both faces.

In order to establish electrical continuity between all the contacts 11 positioned between the first busbar 20-1 and the second busbar 20-2, as shown in FIG. 7, in an embodiment, the individual contacts 11 are unidirectionally oriented such that, for example, the respective springs 131 of the contacts 11 project toward the first busbar 20-1. The second busbar 20-2 here can be provided with a spring projecting toward the adjacent contact 11.

Next, a second embodiment of the present invention will be described. A difference from the first embodiment will be mainly described below. The same components as the first embodiment will be denoted by the same reference signs.

Figure 8:
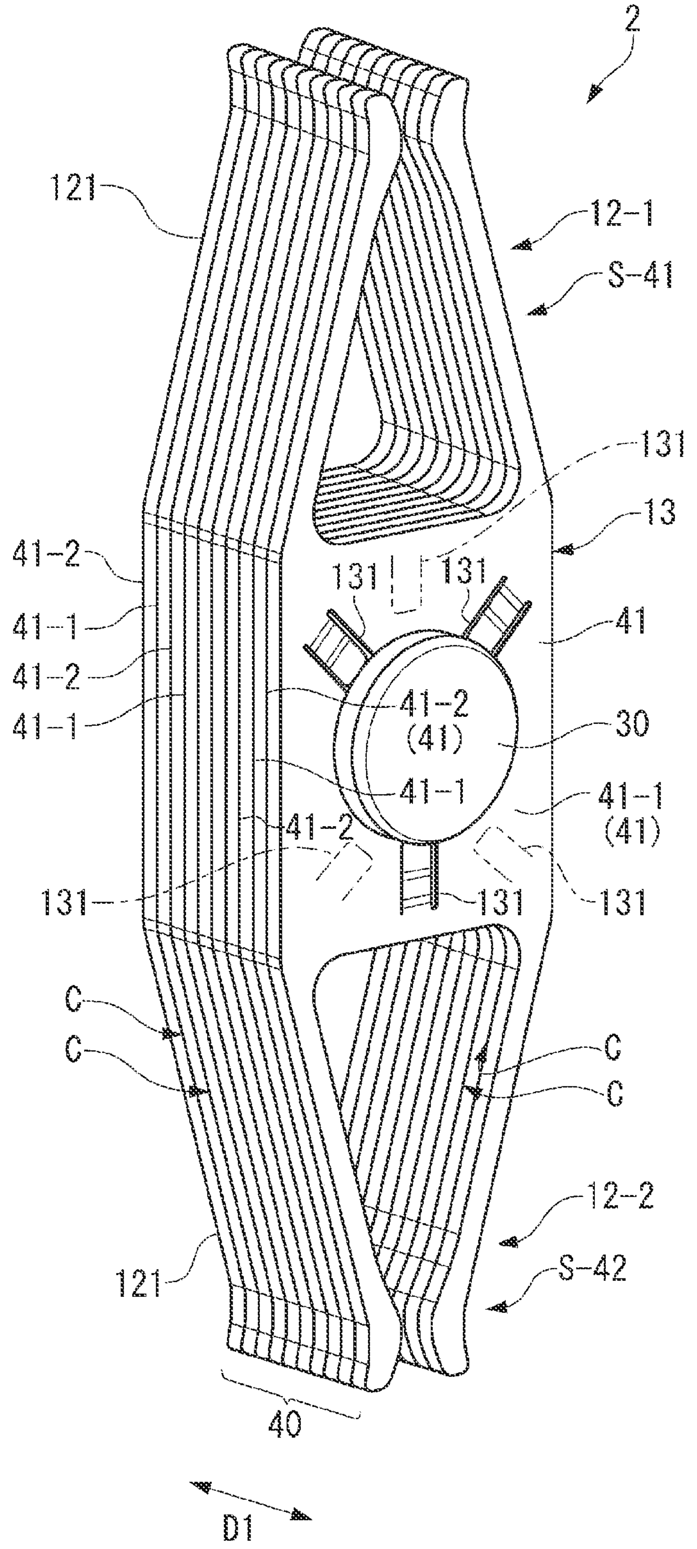
FIG. 8 is an isometric view of a contact assembly according to a second embodiment of the present invention.

FIG. 8 shows a contact assembly 2 not including a busbar 20. The contact assembly 2 includes a contact group 40 composed of two or more contacts 41 laminated, and a fastening element 30. The contact 41 includes a pair of mating portions 12-1, 12-2, and a caught portion 13 caught on each other in a lamination direction D1 by the fastening element 30. The first mating portions 12-1 in a laminated state constitute a socket S-41, and the second mating portions 12-2 in a laminated state constitute a socket S-42.

The caught portion 13 of the contact 41 is formed with a plurality of springs 131, as in the first embodiment. The contact group 40 includes as the contacts 41 two types of contacts 41-1, 41-2 having the springs 131 different in position. The spring 131 of the contact 41-2 is positioned between the springs 131 of the contact 41-1, as shown by a broken line in FIG. 8.

Once the contacts 41-1 and the contacts 41-2 alternately laminated are fastened by the fastening element 30, every spring 131 of the contacts 41-1, 41-2 is pressed against the opposing contact and elastically deforms. Therefore, the elastic force of the spring 131 causes the contacts 41 of the contact group 40 to have electrical continuity with each other.

In the second embodiment, likewise, the mating portions 12 are located by the spring 131 with a clearance C therebetween, so that a larger number of contacts 41 can be densely positioned and distributed in the lamination direction D1 within a limited range. Therefore, like the first embodiment, an increase in the number of contact points and suppression of an increase in temperature due to promotion of heat dissipation are achieved, and the suppression of an increase in temperature enables avoidance of an increase in electrical resistance, which can contribute to an increase in power carrying capacity.

In addition, the contact group 40 of the second embodiment can also ensure the reliability of connection since the presence of the clearance C improves the conformability to a mating counterpart.

Alternatively, a selection may be made from the configurations mentioned in the above embodiments, or an appropriate change into another configuration may be made, without departing from the spirit of the present invention.

For example, if the sheet thickness of each mating portion 12 is increased with the clearance C retained between the mating portions 12, the area of contact between the mating portion 12 and the mate 9 is increased and thus the electrical resistance is reduced, which can suppress heat generation and contribute to suppression of an increase in temperature.

In addition, contact groups 10, 40 may be configured by alternately laminating three types of contacts 11 (or 41) having springs 131 different in position.

In addition, a device for catching a plurality of contacts 11 (or 41) on each other in a lamination direction D1 is not limited to fastening using a fastening element 30 or the like. For example, contacts 11 may be caught on each other by puttying or otherwise sealing the insides (cavities) of through-holes 130 of caught portions 13 laminated. Alternatively, the contacts 11 may be caught on each other by inserting a C-ring, O-ring, or the like into the cavities and allowing it to exert an elastic force radially toward the outside of the through-holes 130.

What is claimed is:

1. A contact assembly, comprising:

a plurality of contacts serving as a socket in a stacked state, the contacts each have a mating portion forming the socket and a held portion held with a held portion of another one of the contacts in a stacking direction of the contacts; and a spring, at least two of the contacts adjacent to each other in the stacking direction have electrical continuity with each other via the spring that is formed in a single piece with the held portion of one of the at least two contacts and is compressible in the stacking direction between the held portion of each of the contacts.

2. The contact assembly of claim 1, further comprising a conductor stacked with the contacts.

3. The contact assembly of claim 2, wherein the conductor has electrical continuity with a contact adjacent to the conductor in the stacking direction, the contact adjacent to the conductor in the stacking direction has another spring that is compressible in the stacking direction against the conductor.

4. The contact assembly of claim 3, wherein the conductor extends in a direction crossing the stacking direction.

5. The contact assembly of claim 2, wherein a contact group including the plurality of contacts is provided in each of a plurality of positions on the conductor.

6. The contact assembly of claim 1, wherein the contacts are held by a fastening element passing through the held portions of the contacts with the spring compressed.

7. The contact assembly of claim 6, wherein the socket is adjustable in orientation by rotation of the plurality of contacts on the fastening element.

8. The contact assembly of claim 6, wherein a contact group including the plurality of contacts is provided in each of a plurality of positions on a conductor.

9. The contact assembly of claim 8, wherein the contact groups held by the fastening element serve as two or more sockets different in orientation.

10. The contact assembly of claim 6, wherein the spring is one of a plurality of springs of the held portion of each of the contacts.

11. The contact assembly of claim 10, wherein each of the springs is composed of a lanced tab around a through-hole passed through by the fastening element.

12. The contact assembly of claim 11, wherein the contacts include a first contact and a second contact having different arrangements of the springs in the held portion.

13. The contact assembly of claim 12, wherein the first contact and the second contact are positioning alternately in the stacking direction.

14. A contact assembly, comprising:

a plurality of contacts serving as a socket in a stacked state, the contacts each have a mating portion forming the socket and a held portion held with a held portion of another one of the contacts in a stacking direction of the contacts; and a spring, at least two of the contacts adjacent to each other in the stacking direction have electrical continuity with each other via the spring that is compressible in the stacking direction between the held portion of each of the contacts, the contacts are held by a fastening element passing through the held portions of the contacts with the spring compressed, a contact group including the plurality of contacts is provided in each of a plurality of positions on a conductor, the contact groups held by the fastening element serve as two or more sockets different in orientation.

15. A contact assembly, comprising:

a plurality of contacts serving as a socket in a stacked state, the contacts each have a mating portion forming the socket and a held portion held with a held portion of another one of the contacts in a stacking direction of the contacts; and a spring, at least two of the contacts adjacent to each other in the stacking direction have electrical continuity with each other via the spring that is compressible in the stacking direction between the held portion of each of the contacts, the contacts are held by a fastening element passing through the held portions of the contacts with the spring compressed, the spring is one of a plurality of springs of the held portion of each of the contacts.

16. The contact assembly of claim 15, wherein each of the springs is composed of a lanced tab around a through-hole passed through by the fastening element.

17. The contact assembly of claim 16, wherein the contacts include a first contact and a second contact having different arrangements of the springs in the held portion.

18. The contact assembly of claim 17, wherein the first contact and the second contact are positioning alternately in the stacking direction.

* * * * *